United States Patent
Stack et al.

[15] 3,691,619
[45] Sept. 19, 1972

[54] METHOD FOR LINING TAPERED CAVITIES

[72] Inventors: Eugene V. Stack, Edward L. Burnett, both of Bay City, Mich. 48706

[73] Assignee: The Dow Chemical Company, Midland, Mich.

[22] Filed: July 28, 1970

[21] Appl. No.: 58,935

[52] U.S. Cl. .................29/451, 29/234, 29/235, 29/525, 285/55
[51] Int. Cl. .................................B23p 11/02
[58] Field of Search....29/451, 525, 157 C, 235, 234, 29/512, 522; 285/55

[56] References Cited

UNITED STATES PATENTS

| | | |
|---|---|---|
| 2,507,638 | 5/1950 | Leahy....................264/249 X |
| 2,562,359 | 7/1951 | Dredell..................29/451 UX |
| 2,756,495 | 7/1956 | Lathrop.................29/512 UX |
| 3,104,432 | 9/1963 | Peterson................29/451 UX |
| 3,383,750 | 5/1968 | Schroeder et al........29/512 X |
| 3,462,825 | 8/1969 | Pope et al..............29/451 |

Primary Examiner—Charlie T. Moon
Attorney—Griswold & Burdick, Richard G. Waterman and Robert B. Ingraham

[57] ABSTRACT

Tapered cavities are lined with a plastic liner such as a reducer filler flange by forcing a deformable plastic tube into the cavity to reduce the diameter of at least the portion of the tube which passes through the cavity and flanges are formed on the plastic tube.

8 Claims, 3 Drawing Figures

INVENTORS.
Eugene V. Stack
Edward L. Burnett
BY Robert R. Ingraham
AGENT

METHOD FOR LINING TAPERED CAVITIES

A variety of methods have been employed to line cavities with plastic materials in order to achieve chemical and/or abrasion resistance. Such methods include molding of preformed liner and subsequent installation of the liner in a cavity; directly molding a liner in the desired cavity and the like. In lining cavities such as are found in reducer filler flanges, oftentimes a substantial investment is required in equipment, including molds, dies and the like. Generally, a different mold is required for each size of flange which must be lined. Oftentimes such molding techniques require the application of relatively high pressures, and often-times such pressures are undesirable when employing cast iron fittings. Frequently in pipe fittings wherein a lined cavity reduces in size, such as a 4 inch to 3 inch reducer liner, wear often occurs at the smallest portion of the passage or cavity wherein the velocity of a liquid passing therethrough is the greatest.

It would be desirable to provide a liner of increased thickness at a location generally corresponding to minimum diameter of the fitting.

It would also be desirable to have available an improved method for the lining of tapered cavities such as are found in reducer filler flanges.

It would further be desirable if such an improved method would employ simple tools which did not require a major investment.

It would also be desirable if such a method could be employed with various lining materials.

These benefits and other advantages in accordance with the present invention are achieved in a method for the lining of tapered cavities having a generally circular cross-section, the steps of the method comprising providing a body, the body defining a passageway, the passageway having at least a first opening, the passageway tapering inwardly, positioning a synthetic resinous thermoplastic liner tube generally coaxially with said passageway, slidably supporting the liner tube by means of a generally cylindrical configuration, applying generally axially directed force to the liner tube to thereby cause the liner tube to enter the tapering passageway and conform to the tapering passageway.

Further features and advantages of the present invention will become more apparent from the following specification taken in connection with the drawing wherein.

Figure 1:
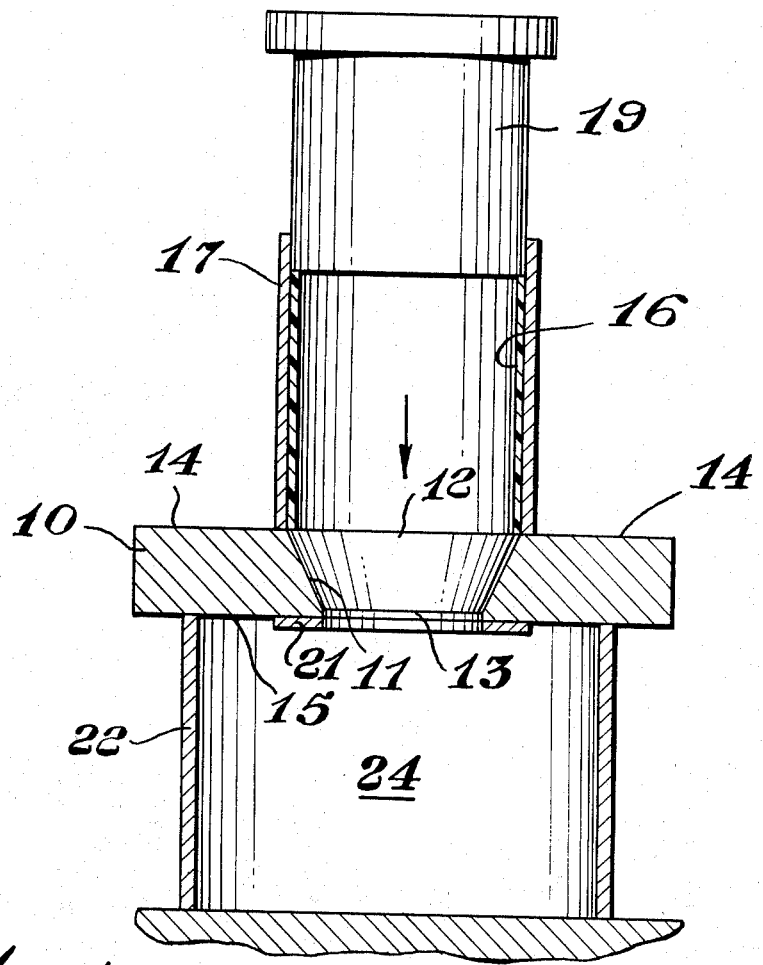
FIG. 1 depicts the initial steps of the method of the present invention.

In FIG. 1 there is schematically depicted the initial steps of the present invention wherein a body 10 such as a reducing filler flange defines a tapering cavity 11 having a generally circular cross-section. The cavity 11 has a first or major opening 12 having a larger diameter and a second or minor opening 13 having a smaller diameter. The opening 13 is generally coplanar with a first face 14. The flange 10 has a second face 15 generally parallel to the first face 14. The openings 12 and 13 are generally coaxial, and the cavity 11 has a generally frustoconical configuration. A synthetic resinous thermoplastic liner tube 16, without inner support, having a diameter about equal to the diameter of the opening 13 is disposed generally coaxially with the passageway 11. A support means or sleeve 17 surrounds the liner tube 16 and permits the tube 16 to slide therein. A ram or force applying means 19 engages the tube 16 at a location remote from the flange 10. The ram 19 is adapted to slide within the support tube 17 and force or push the liner tube 16 into the cavity 11. Generally adjacent to the opening 13 and coaxially disposed thereabout is a gasket 21. A flange support means 22 is in operative engagement with the second face 15 of the flange 10. The support means 22 defines a space 24 into which a liner such as the liner 16 may project.

Figure 2:
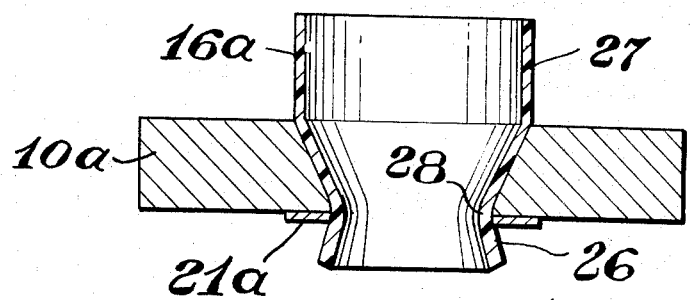
FIG. 2 depicts a liner inserted in accordance with the present invention.

FIG. 2 depicts a filler flange 10a such as is depicted in FIG. 1, wherein the liner 16a has been forced into the frustoconical cavity to provide a radially inward deformation. The liner 16a has a first or smaller projecting portion 26 of substantially reduced diameter and increased wall thickness and a second projecting wall portion 27 whose diameter is generally equal to the original tube. The gasket 21a is positioned against the first projecting portion 26. The projecting portion 26 has an increased wall thickness when compared to the undeformed portion of the tube 16a, such as the portions 27. Thickening desirably occurs in the location 28 generally corresponding to the minimum diameter of the flange 10a.

Figure 3:
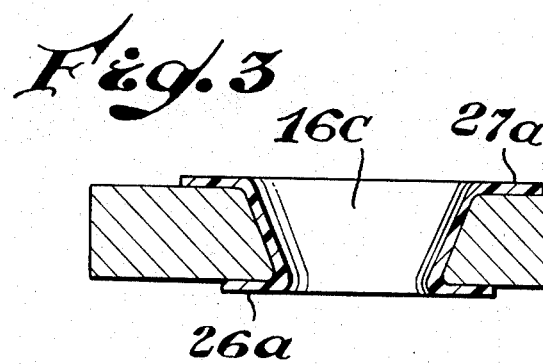
FIG. 3 depicts a reducer filler flange lined by the method of the present invention.

FIG. 3 depicts a flange 10b having a plastic liner 16c which is prepared by forming flanges 27a and 26a from an article such as depicted in FIG. 2.

In accordance with the method of the present invention, the liner is passed through the tapered cavity in a direction indicated by the arrow in FIG. 1 which provides a desired size of reduction and causes the liner to conform to the inner surface of the frustoconical cavity such as the cavity 11. Usually, such a reducing operation may be accomplished for many plastics at or about room temperature. Such a reduction must be done above the glass or brittle temperature of the plastic liner composition and below the softening temperature thereof. In this temperature range, the plastic material is capable of limited, relatively slow viscoelastic flow under stress and can be deformed to a reasonable degree without rupture of the tube.

A wide variety of thermoplastic resinous compositions are useful in the practice of the present invention including polyperfluorocarbons such as polytetrafluoroethylene, polychlorotrifluoroethylene; polyhalohydrocarbons such as polyvinylfluoride; vinylidene chloride polymers such as sarans, vinylidene chloride-ethyl acrylate copolymers; polyvinyl chloride; polyolefins such as polypropylene, polyethylene, resinous polymers of ethylene and propylene; nylon 6, nylon 66, nylon 7 and the like; alkenyl aromatic polymers including styrene polymers such as rubber-modified polystyrene, styrene-acrylonitrile; polyethers such as polymers of 2,2-bis(chloromethyl)oxacyclobutane and the like.

The essential characteristic of the lining to be operable in the present process is that it be deformable at a temperature below its softening temperature; that is, capable of viscoelastic deformation at a temperature between the glass temperature and the softening temperature. This phenomenon is found in most of the materials referred to as plastics which have not been cross-linked to a point where heat softening can no longer occur. As the flow phenomenon is temperature and time dependent, more rapid sizing or reduction of the liner may be done at temperatures near the softening temperature, whereas the same amount of deformation may be induced in the liner at a temperature slightly above the glass temperature over a much longer period of time. The recovery or expansion of the compressed liner similarly is time dependent, longer times being required as the temperature approaches the glass temperature and shorter time periods required as the temperature approaches the softening temperature. With many synthetic resins, the glass temperature is below normal ambient temperature and the softening temperature is well above ambient temperature. Some plastics of this nature are some saran compositions, rubber-modified polystyrene, the so-called "impact" grade polystyrene, polypropylene, polytetrafluoroethylene, resinous polymers of ethylene and propylene, nylon 66, etc.

Once the cavity has been lined in accordance with the present invention, formation of the flanges if desired is readily accomplished by many conventional flanging techniques applicable to thermoplastic lined pipe. A wide variety of flanging techniques are well known in the art, some of which are set forth in the following U.S. Pat. Nos.: 2,823,418; 3,020,068; 3,042,965; 3,284,107; 3,284,108; 3,341,894; 3,383,750 and 3,461,505, and the teachings of these patents are herewith incorporated by reference.

Generally where the reduction required in diameter of the tube is small, one may readily employ a liner material which approximates the diameter of the largest opening of the cavity to be lined. For example: if a reducer flange which is adapted to connect 3 inch pipe to 2 inch pipe, or 4 inch pipe to 3 inch pipe and the like, is to be lined, a tube desirably is employed which has an outside diameter approximating the larger dimension. When a greater reduction is required, such as a two fold reduction (for example: a 2 inch to 1 inch pipe, or 4 inch pipe to 2 inch pipe, or 3 inch pipe to 1-½ inch pipe), it is generally desirable to employ a tube having an intermediate diameter such as 1-½ inches when lining a 2 inch to 1 inch reducer; 3 inch tube when lining a 4 inch to 2 inch reducer. When utilizing an intermediate tube, a portion of the tapering cavity is unlined after the tube is passed therethrough; i.e., only a portion of the inner wall is in contact with the liner. However, by employing a sizing technique such as that set forth in U.S. Pat. No. 3,461,505, wherein the tapered plug is employed to conform the liner to the unlined portion of the during the flanging operation, a highly satisfactory lining is obtained.

The following examples illustrate the manner in which the principles of the invention are applied, but are not to be construed as limiting the invention.

EXAMPLE 1

A reducer filler flange generally as depicted in the drawing and adapted to connect 2 inch to 1-½ inch pipe is lined employing a ⅛ inch thick polytetrafluoroethylene tube having a diameter of about 2 inches and employing a section of steel pipe in which the polytetrafluoroethylene tube is a sliding fit. A ram is employed which has an outside diameter equal to that of the tube. When rammed, the support tube and flange are assembled in the manner depicted in FIG. 1. A force of 1,000 pounds is applied to the polytetrafluoroethylene tube and the plastic tube is forced into the filler flange at a rate of about one-half inch per minute. Prior to forcing the polytetrafluoroethylene tube through the fitting, a gasket is applied to the small end of the flange and arranged coaxially with the opening and maintained in place with masking tape. When the polytetrafluoroethylene tube is passed about half way through the reducing fitting, a configuration such as that depicted in FIG. 2 is obtained and the projecting end portions of the liner are flanged by the process set forth in U.S. Pat. No. 3,461,505.

EXAMPLE 2

Employing the procedure of Example 1, a 3 inch to 2 inch reducer flange is lined employing a 3 inch diameter polytetrafluoroethylene tube having a wall thickness of one-eighth inch.

EXAMPLE 3

Employing the procedure of Example 1, a 4 inch to 3 inch reducer flange is lined employing a 4 inch diameter polytetrafluoroethylene tube having a wall thickness of one-eighth inch.

EXAMPLE 4

A reducer filler flange adapted to connect 2 inch to 1 inch pipe is lined in a manner similar to Example 1, with the exception that a 1-½ inch polytetrafluoroethylene tube is employed and the plug of the flanging apparatus is used to conform the liner material to the portion of the tapered cavity which is not in contact with the liner.

EXAMPLE 5

Employing the procedure of Example 4, a 4 inch to 2 inch reducer filler flange is lined employing a 3 inch diameter polytetrafluoroethylene tube.

EXAMPLE 6

When the procedure of Example 5 is repeated, with the exception that a 4 inch diameter tube is employed, minor wrinkling of the liner occurs adjacent the 2 inch opening.

In all cases, the thickness of the lining adjacent the smaller opening of the reducing filler flange is greater than the thickness of the tube employed for the lining operation. Although the examples specifically illustrate the invention employing polytetrafluoroethylene, a wide variety of other plastic materials are readily employed such as hereinbefore set forth, including laminates, such as laminates of polypropylene, polyethylene and the like.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

We claim:

1. A method for the lining of tapered cavities having a generally circular cross-section, the steps of the method comprising providing a body, the body defining a passageway, the passageway having at least a first opening having a larger diameter, the passageway tapering inwardly to a smaller diameter, positioning a synthetic resinous thermoplastic liner tube generally coaxially with said passageway, the liner tube having a diameter from a diameter greater than the diameter of the smaller opening to a diameter approximating the diameter of the larger opening, slidably supporting the liner tube by means of a generally cylindrical configuration, applying a generally axially directed pushing force to the liner tube in the direction of the body and the tube to thereby cause at least a portion of the liner tube to move from the cylindrical support and enter the tapering passageway and conform thereto.

2. The method of claim 1 including the step of positioning the liner tube to cause a portion of the tube to project from the passageway and subsequently deforming the projecting portion to form a flange adjacent to the passage and external to the body.

3. The method of claim 1 including the step of forcing the liner tube into the body at a temperature below the softening temperature of the plastic liner and above the glass temperature thereof.

4. The method of claim 2 including the step of providing a gasket surrounding the projecting portion of the liner tube prior to forming the flange.

5. The method of claim 1 wherein the body is a reducer filler flange.

6. The method of claim 1 wherein the diameter of the tube approximates the largest diameter of the passageway.

7. The method of claim 1 wherein the passageway has a first opening and a second opening and the liner tube has a diameter less than that of the first opening and substantially greater than the second opening.

8. A method for the lining of a pipe fitting having a tapered passageway, the passageway having a first opening and a second opening, the first opening having a larger diameter and the second opening having a smaller diameter, positioning a synthetic resinous thermoplastic liner tube generally coaxially with the passageway and adjacent the first opening, the liner tube having a diameter greater than the smaller opening to approximately the larger opening, slidably supporting the liner tube by means of a generally cylindrical configuration, applying a generally axially directed pushing force to the liner tube in the direction of the fitting and the tube at a temperature below the softening temperature of the tube and above the glass temperature, to thereby cause the liner tube to move from the cylindrical support and enter the passageway and conform thereto, the liner tube being of sufficient length to project outwardly from the first and second passageways, subsequently deforming the projecting portions of the liner to form flanges adjacent the first and second openings.

* * * * *